Aug. 11, 1953 D. E. OGDEN 2,648,308
STANCHION FOR DOMESTIC ANIMALS
Filed Jan. 21, 1952 2 Sheets-Sheet 1
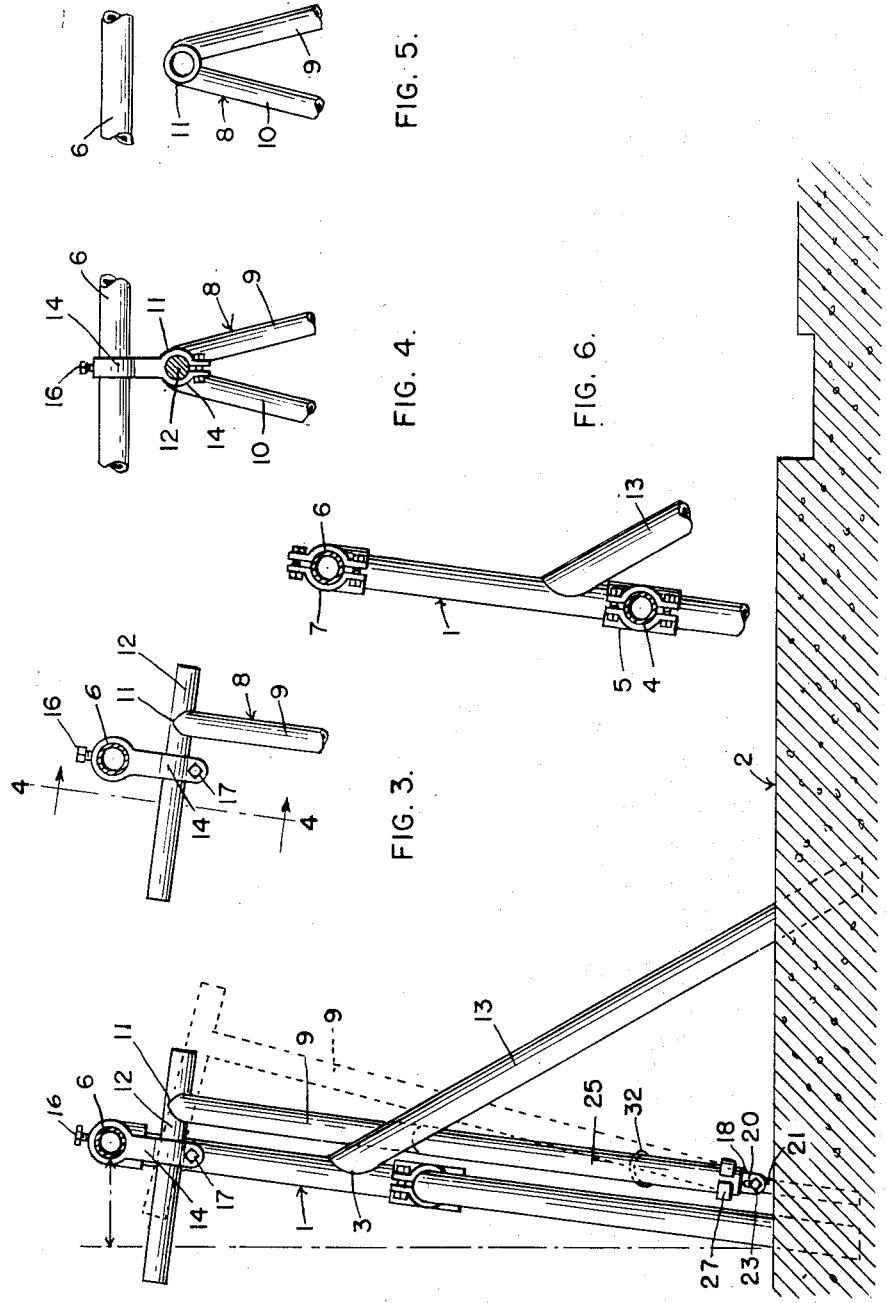
INVENTOR
DANIEL E. OGDEN
BY
ATTORNEYS Aug. 11, 1953  D. E. OGDEN  2,648,308
STANCHION FOR DOMESTIC ANIMALS
Filed Jan. 21, 1952  2 Sheets-Sheet 2
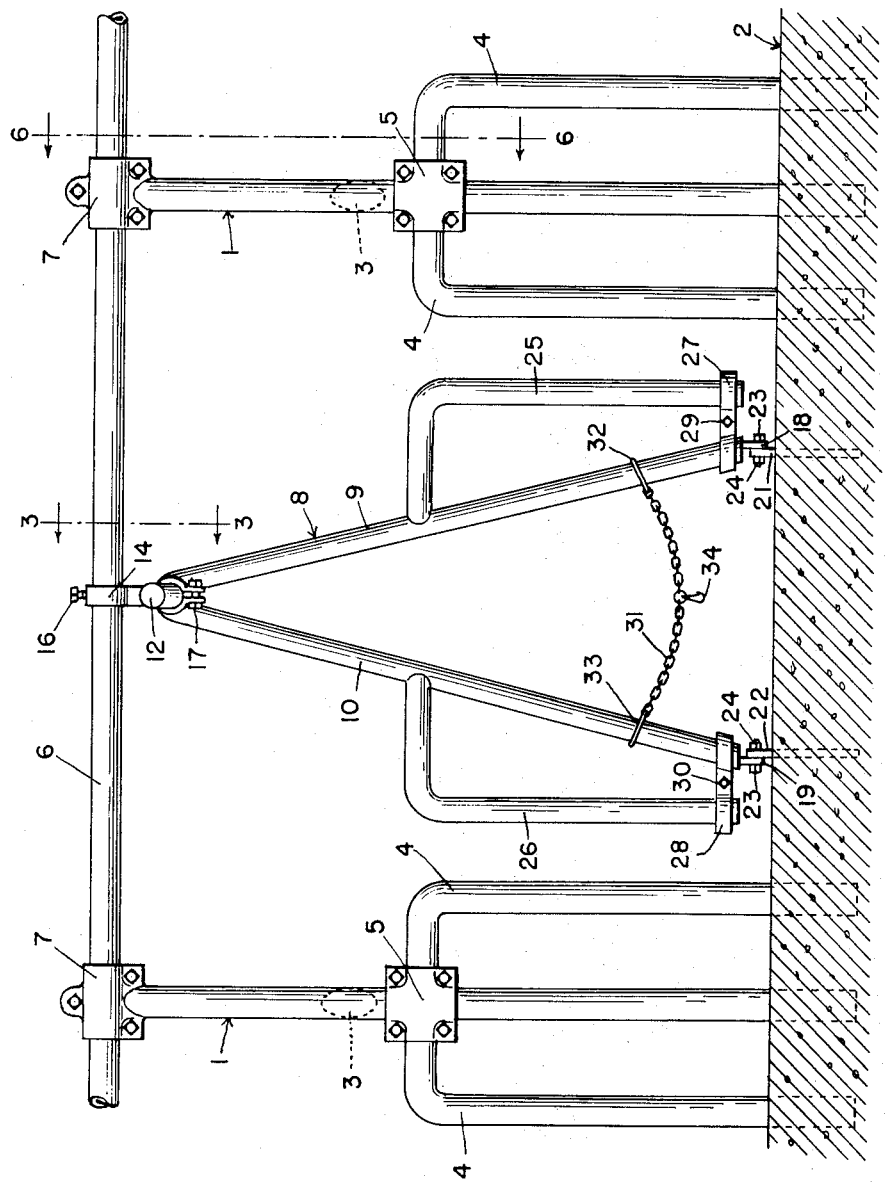
INVENTOR
DANIEL E. OGDEN
ATTORNEYS Patented Aug. 11, 1953

2,648,308

UNITED STATES PATENT OFFICE 2,648,308

STANCHION FOR DOMESTIC ANIMALS

Daniel E. Ogden, Hamilton, N. Y.

Application January 21, 1952, Serial No. 267,425

2 Claims. (Cl. 119—147)

This invention relates in general to animal stalls and has more particular reference to a stanchion for securing a cow or other animal in its stall.

An important object of the invention is to provide a stall including a stanchion which will cause the animal, hereinafter referred to as a cow, to move to a position nearer to the conventional barn gutter, when in a standing position but at a greater distance from the gutter when in a lying down position to thereby protect the cow's udder from contamination in this position.

An additional object is to provide a stanchion of the type described, which stanchion is provided with means of adjustment whereby the position of the cow with reference to the gutter may be adjusted for both the standing and reclining positions.

A further object is to provide a stall comprising a minimum of parts for positively positioning a cow in its standing and reclining positions.

Other objects will appear hereinafter throughout the specification.

In the drawings:

Figure 1 is a side elevational view partly in section.

Figure 2 is an elevational view with one of the parts in section.

Figure 3 is a detail view, taken on the line 3—3 of Figure 2, with parts broken away and in section showing the double adjustable clamp and the parts to which it is connected.

Figure 4 is a view taken on the lines 4—4 of Figure 3.

Figure 5 is a view similar to Figure 4 with the double clamp removed, and

Figure 6 is a view taken on the lines 6—6 of Figure 2.

Referring to the drawings, 1 is a frame including a plurality of uprights or main line supports, preferably of tubular metal such as pipes embedded in the concrete floor 2. Braces 13 forming the usual stalls may be embedded in the floor 2 and welded at 3 to the frame. Headguards 4 may be also embedded in the floor and held to the frame by clamps 5. The use of such headguards to prevent the cow from thrusting her head too far forward, are optional, and therefore not a necessary part of this invention.

Also forming a part of the frame is the top main line pipe 6, and the uprights are rigidly connected to said pipe 6 by means of the upright pipe clamps 7.

The stanchion yoke 8 consists of a pair of diverging arms 9 and 10 forming an inverted V. The apex 11 of these diverging arms is rigidly attached as by welding to a stud member 12, which latter extends at right angles to the top main line pipe 6, and preferably below said pipe as shown in the several figures.

The stud member partially supports the stanchion yoke in various positions of adjustment by means of the double clamp 14 thereby permitting adjustment in several positions of inclination, two such positions of adjustment being shown in full and dotted lines in Figure 1. A slight sidewise adjustment may be made of the clamp and stanchion yoke along main line pipe 6, due to the fact that the double clamp 6 has an eye 15 through which pipe 6 is passed. The eye is provided with a screw threaded opening through which the locking screw extends. After proper adjustment the locking screw 16 is caused to tightly engage pipe 6 in order to fix the stanchion yoke in adjusted position transversely of the stall. Adjustment in various positions of inclination of said stanchion yoke, longitudinally of the stall, is effected by loosening the bolt 17 of the double clamp, sliding the stud member 12 to a position of proper inclination of the stanchion yoke and then tightening the bolt 17 to hold the parts in adjusted position.

The adjustment of the stanchion yoke in both a longitudinal and a transverse direction is facilitated by the following construction.

Preferably welded in the open ends of diverging arms 9 and 10 are primary extensions or iron members 18 and 19. These extensions are each provided with a slot 20.

Embedded in the floor are secondary extensions or iron members 21 and 22. These also are provided with slots, not shown, and extending through the pair of slots of each proximately located primary and secondary member or iron are threaded bolts 23, which are in threaded engagement with nuts 24 respectively.

By this construction the ends of the stanchion yokes are held in substantially fixed position, yet these ends may be quickly and easily detached from their anchoring means. Additionally the slots permit a slight relative movement of the stanchion yoke whereby said yoke may be adjusted along the length of the top main line pipe 6.

The diverging arms 9 and 10 are provided with stanchion headguards 25 and 26 respectively, and the lower ends of these guards are held to the diverging arms by two piece clamps 27 and 28. These clamps are held in the position shown in Figures 1 and 2 by bolts 29 and 30.

A chain 31 having its ends 32 and 33 slidably engaging the diverging arms 9 and 10 is provided with a swivel snap hook 34 for attachment to the collar of a cow.

The rings 32 and 33 are prevented from moving too far upwardly by the joints of the stanchion yoke headguards, and from moving too far in a downward direction by the two part clamps 27 and 28. However, upon removal of said clamps the chain may be easily and quickly removed from the arms 9 and 10.

Double clamp 14 may be clamped to stud member 12 on either side of the point of attachment of apex 11 of the stanchion yoke. In its various positions of adjustment it will accommodate cows of various sizes to thereby assure that the cow will be further to the rear of the stall when standing, whereby her posterior will be directly over the gutter, but will be forward of the gutter when lying down, thus protecting her udder from contamination.

It is believed that the invention and numerous of its attendant advantages will be understood from the foregoing description and it is obvious that numerous changes may be made in the construction and arrangement of the several parts without departing from the spirit and scope of my invention or sacrificing any of its attendant advantages, the form hereinbefore described being a preferred embodiment for the purpose of illustrating my invention.

The gutter may be similar to Ferris Patent No. 1,197,193, granted September 5, 1916.

I claim:

1. A stanchion construction comprising a stanchion yoke having diverging arms forming an inverted V, said arms having lower ends, means operatively associated with said lower ends for affixing the ends of said arms to prevent swinging movements of said arms, clamping means adjustably engaging the stanchion yoke apex for adjustably fixing the position of said stanchion yoke apex in a direction transversely of the plane of said yoke arms, and a chain slidably mounted on said diverging arms, and a stanchion headguard mounted on each stanchion arm, said headguards having means engaging said yoke arms for limiting the movement of said chain on said arms.

2. A stanchion construction comprising a stanchion yoke having diverging arms forming an inverted V, said arms having lower ends, means operatively associated wih said lower ends for affixing the ends of said arms to prevent swinging movements of said arms, clamping means adjustably engaging the stanchion yoke apex for adjustably fixing the position of said stanchion yoke apex in a direction transversely of the plane of said yoke arms, and a chain slidably mounted on said diverging arms, and a stanchion headguard mounted on each stanchion arm, said headguards having means engaging said yoke arms for limiting the movement of said chain on said arms, said last named means including a removable clamp connecting one end of each headguard to a stanchion arm.

DANIEL E. OGDEN.

References Cited in the file of this patent

UNITED STATES PATENTS

| Number | Name | Date |
| --- | --- | --- |
| 1,197,193 | Ferris | Sept. 5, 1916 |
| 1,197,194 | Ferris | Sept. 5, 1916 |
| 1,311,658 | Lewis | July 29, 1919 |
| 1,417,184 | Lewis | May 23, 1922 |
| 2,578,093 | Schillinger | Dec. 11, 1951 |

FOREIGN PATENTS

| Number | Country | Date |
| --- | --- | --- |
| 111,296 | Sweden | May 25, 1944 |